Jan. 28, 1964 K. COPER 3,119,897
INSULATED WIRE FOR HIGH TEMPERATURE USE AND COILS MADE THEREFROM
Original Filed June 16, 1959
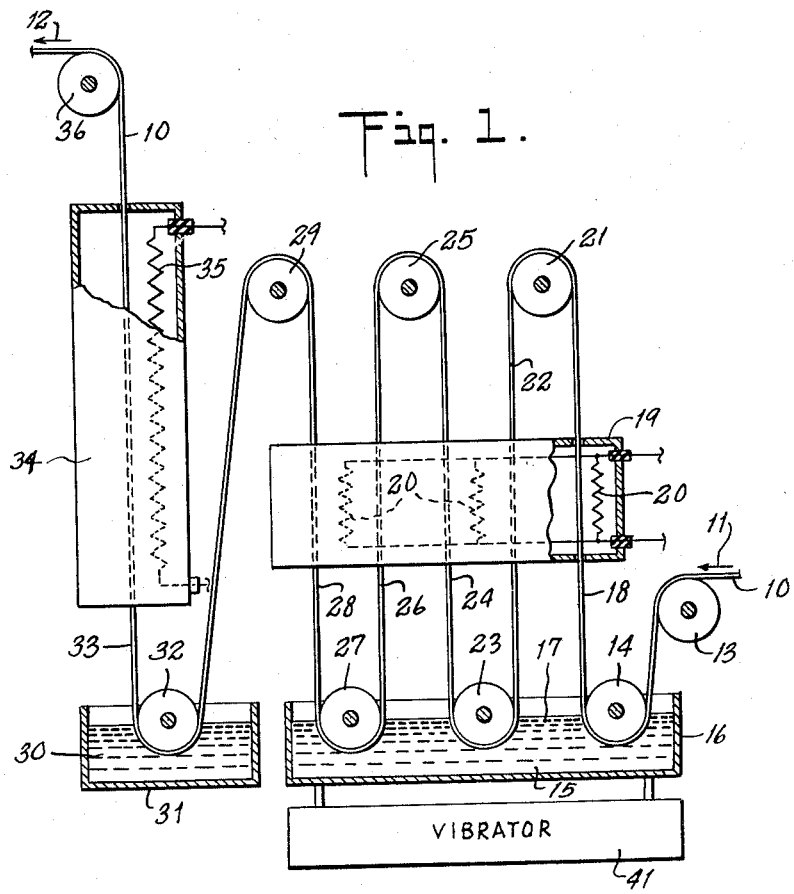
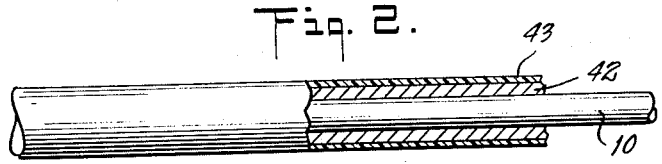
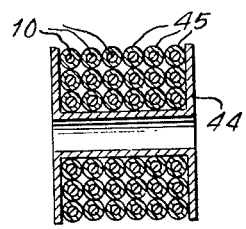
INVENTOR.
KURT COPER
BY John A. Harvey
ATTORNEY United States Patent Office 3,119,897
Patented Jan. 28, 1964

3,119,897
INSULATED WIRE FOR HIGH TEMPERATURE
USE AND COILS MADE THEREFROM
Kurt Coper, Brookhaven, Pa., assignor to The Daven
Company, Livingston, N.J., a corporation of Delaware
Original application June 16, 1959, Ser. No. 820,757. Divided and this application Mar. 14, 1961, Ser. No. 95,695
6 Claims. (Cl. 174—110)

The present invention relates to insulated wire for high temperature use, and to coils made therefrom. It relates more particularly to a novel type of insulating wire, which is usable in precision-type electrical components, with a maximum efficiency of insulation and a minimum of change in the electrical characteristics incident to use at high temperatures.

The importance of providing insulated electric wire, and particularly very small diameter wire, for use under high temperature conditions is becoming increasingly apparent to the electrical industry and particularly to that portion thereof having to do with electronics. This importance is now so well known to those skilled in the art that the particular uses of electrical components under high temperature conditions is well known and need not be discussed in detail here. These high temperature uses, however, demand not only that the equipment in question shall be able to withstand high temperatures without complete destruction, but also in many instances that the equipment, such as electrical components, inductive coils, resistors and the like, shall be able to operate at the high temperatures with minimum variations in their electrical characteristics, particularly variations incident to the temporary or permanent breaking down of the insulating characteristics of the insulation used.

The present invention particularly relates to wire and devices using such wire, which are subjected to operation at temperatures above that at which insulating materials of an organic nature are usable, for example, at temperatures of the order of magnitude of 500° C. Under these circumstances, and due to the fact that the heat would cause destructive action in any insulation of an organic nature, it is necessary to resort to some type of inorganic insulation, which will not be permanently or even temporarily adversely affected by the temperature to which the wire or apparatus using such wire is exposed.

In the past it had been proposed, and in some instances tried, to use vitreous types of insulation, i.e. insulation of a type consisting of or including glass or glassy matrix-type materials. For example, most chinaware and many ceramic bodies which are baked and partially fused incident to the baking or firing include not only particles of refractory oxides, but also a glassy matrix. It is known that glass, such as ordinary flint glass, for example, when subjected to progressively increasing temperatures, has a progressively lower electrical resistance. The ultimate lowering is attained when such glass is melted at the temperatures at which it is normally melted in commercial glass fabrication (about 2600° F.), at which temperatures it is possible to keep the glass molten in electric furnaces with current flowing through the glass itself between a pair of spaced submerged electrodes. At intermediate temperatures at which glassy materials are substantially solid, but still far above ordinary room temperatures, the electrical resistance progressively falls as the temperature rises. Thus if material consisting of or a material including a substantial proportion of glassy matrix were used as insulation for wire, the reduction in the resistance of the insulating material at operating temperatures would be sufficient substantially to vary the electrical characteristics of an electric component made from the wire, for example, a wire-wound resistor, so that the electrical characteristics would be far from those which would be attained if the insulation were in effect perfect or ideal. The present invention approaches this ideal to a far greater extent than has been possible heretofore. In so doing, it is a practical requirement of the present invention that the insulation shall be substantially free of glass and glassy matrix-type material.

Glass and glassy matrix-type materials are practically prohibited for use under certain conditions for which the present invention has particular utility. Due to a substantial value of electrical conductivity in these materials as they are heated toward a fluid condition, any electrical potential difference prevailing along the length of a wire so insulated will almost inevitably result in some electrolytic action in the insulation (if of a glassy nature), which will tend to cause rapid deterioration and possibly failure of the wire itself. This is practically precluded when the present invention is used in that the electrical conductivity of the insulation is so low that electro-chemical or electrolytic action contributed thereby is practically nil and in any case negligible in amount.

There are available for use as insulation at high temperatures the usual and well-known oxides such, for example, as alumina and silica. As a practical matter, however, these materials will not adhere together and/or to a wire in a way to provide the desired insulation without there being some added material present affording some type of agglomerating characteristics and non-spalling which are not possessed by the known ceramic oxides themselves. It is also often necessary that wire insulated for use at high temperatures shall be adaptable to be formed or reformed into desired shapes or forms subsequent to the application of the insulation as, for example, by winding it from a supply reel into coil form, and that this manipulation of the wire shall be feasible without damage to the insulation. A method of attaining this desired or necessary characteristic is the subject of the present invention, both as to the forming of the insulation on the wire per se and also as to the fabrication or forming of the wire into its final desired form. In this connection the present invention also is directed to the insulated wire per se as an article of manufacture.

Summarizing the present invention, it comprises an insulated wire prepared by passing the bare wire to be insulated through a semifluid body, and preferably through a thixotropic mixture having a maximum or solids, of material capable of coating the wire and providing the desired type of inorganic insulating coating thereon. From a broad point of view, this insulating coating comprises about three parts by weight of at least one solid refractory oxide selected from the group consisting of oxides of zirconium, titanium, silicon and aluminum, and preferably zirconium oxide, and about one part by weight of aluminum phosphate (AlPO$_4$), with the possible addition of other materials useful for assisting in forming the desired type of mixture, such as a relatively minor proportion of a fine clay or a desired proportion of a solid filler material such as aluminum metaphosphate, and all in the presence of enough water to provide the desired consistency for the mixture. This mixture may be maintained in a semifluid state by suitable vibrating means as hereinafter set forth. The wire is passed through this mixture and then through a zone in which the portion of the mixture adhering to the wire is partially dried. These two steps of passing the wire through the mixture and the partial drying of the material adhering to the wire are preferably repeated several times, so as to build up a desired thickness of coating on the wire. Following this, the wire is coated with a suitable organic varnish to preserve the remaining moisture content in the inorganic coating previously applied and thereby to prevent damage to the coating when the wire is bent, as when winding the wire into a coil, for example, or is in some way formed into its desired final shape. Following the final disposition of the wire in its final position and/or shape, the coil or body of wire is exposed to a relatively high temperature, such as 800°–1000° C., for a time sufficient to volatilize substantially all volatilizable materials present in or on the coating, including substantially all the organic varnish placed thereon for moisture retention purposes. It is found that the wire, and components formed therefrom when so made, will have desired electrical and other characteristics so as to be usable under high temperature conditions without substantial variation between the electrical characteristics of the wire at the high temperatures and those which this wire would theoretically have if the insulation were perfect.

The invention may best be explained by reference to the accompanying drawing, wherein:

FIG. 1 is a diagrammatic representation, with parts in section, of an apparatus for preparing coated wire according to this invention;

FIG. 2 is an enlarged view with parts in longitudinal section showing a coated wire prepared according to this invention; and FIG. 3 is a diagrammatic view on a substantially enlarged scale of a reel onto which wire, insulated in accordance with this invention, has been coiled and in which the volatile materials applied onto the wire during its preparation have been burned or vaporized away as in a high temperature coil.

The present detailed consideration of the present invention may well start with the composition of the coating material which is applied to the wire. A major constituent of this material is a ceramic or refractory oxide in solid particle form, this material being at least one of the oxides selected from the group consisting of the oxides of zirconium, titanium, silicon and aluminum. At the present time zirconium oxide is preferred with respect to any of the other materials of this group, so that the examples hereinafter given illustrate the use of zirconium oxide. It will be understood, however, that the other oxide materials named may be substituted on a weight-for-weight basis for zirconium oxide with good, but it is believed not as good, results.

The next essential ingredient of this wire coating composition according to the present invention is aluminum phosphate ($AlPO_4$), which has no equivalents as far as is now known. This aluminum phosphate acts, in accordance with present theories, to some extent as a flux or binder for the refractory oxide, although it does not, as far as has been ascertained, combine therewith to form any substantial proportion of glassy matrix-type material, which is practically precluded for reasons above set out.

These two materials, both in solid and fine particle form, are intimately mixed together with some water and formed as a semi-fluid body or thick slip, possibly with the addition of a minor proportion of clay, to assist in slip forming. In any event they will be present in fine particle form, preferably 400-mesh and finer, and will be present in a more or less fluid mixture, preferably having a maximum of solids, but one which is sufficiently fluid so that some of the solid material will adhere to wire passed therethrough. The ideal mixture in accordance with the present invention is what is termed as a thixotropic mixture, i.e. one having the property of becoming fluid upon agitation or shaking, but gelling again when left at rest. This mixture is preferably kept in a semifluid state by agitating the container in which it is kept. It is found that the application of substantially continuous vibrations at 60 cycles per second by the use of suitable vibrating means, which are available commercially, is sufficient to effect this result, such vibrating means being, for example, one known as "Syntron."

In general, the proportions of the two essential ingredient materials named should be about three parts by weight of the solid refractory oxide to about one part by weight of aluminum phosphate, with a relatively minor proportion of clay such as fine modeling clay, if used. This will be discussed in greater detail in connection with actual examples of the process. In any event, it is believed that the proportions are not narrowly critical.

As above generally set forth, after the coating is applied to the wire, it is only partially dried, so as to leave a proportion of the moisture (water) content still on or in the coating and thereby to keep it in a more or less flexible condition, permitting the wire to be wound or shaped in a conventional manner without damage to the coating. This coating and its moisture content are further preserved by encasing or enveloping it with a layer of an organic varnish, which may thereafter be volatilized. Following the treating of the wire in this way, it may be shipped or handled in any conventional manner and then may be wound, for example, onto refractory cores, to provide wire wound resistors and the like, such as is diagrammatically illustrated in FIG. 2.

As shown in FIG. 2, the wire of conductive metallic material is illustrated at 10, this wire being surrounded by a ceramic coating 42 applied as herein disclosed and this coating in turn being surrounded by an outer coating or envelope 43 of an organic varnish or the like. It will be understood that the coating 42 still contains a substantial amount of moisture so as to render this coating quite pliable in character, particularly when it is bound-in by the organic coating 43. This enables the handling or bending of the wire without damage to the coatings 42 and 43 during any normal handling and/or bending to include any mechanical action which may be required incident to forming the wire into a coil, for example.

Following the fabrication of the insulated wire to its desired form for ultimate use, it is conventional to heat-treat it by exposing it to heat at temperatures and for times sufficient to vaporize substantially all the volatizable material of or in the coating. This will include substantially all of the organic varnish used as well as substantially all the remaining moisture content, which was preserved in the inorganic coating by the layer of organic varnish. It is the present theory that there is some physical bonding which takes place, probably during the heat treating as aforesaid, between the constituents of the inorganic coating, but without the formation of any substantial amount of glassy matrix material. On the other hand, it is believed that there is no substantial chemical reaction between the aluminum phosphate and the refractory oxides of a type which would or could yield the phosphate salts of any of the materials present other than the aluminum, with which the phosphate radicals are initially combined. This is deemed quite important, as the presence of phosphate salts is believed generally to be undesirable. The aluminum phosphate ($AlPO_4$) solution does react with the material of the wire; but because of the short time of exposure of the wire to this solution there is no appreciable damage to the wire.

The manner of applying the coating from a practical point of view is best illustrated in the accompanying drawing in which a wire is shown at 10 and is drawn in the direction indicated by arrows 11 and 12 from a supply reel (not shown) which is arranged on the right of the apparatus shown in the drawing. The wire 10 may then be directed around one or more idlers as shown at 13 and thence passes around a pulley or drum 14 which is partially immersed in a semifluid body of material 15 in a container 16, the body of material 15 preferably being maintained about up to a level generally indicated at 17. The container 16 for the body of material 15 may be suitably vibrated by being mounted in a manner to permit such action and being suitably connected as shown diagrammatically to a vibrator 41, which may, in practice, be a commercial type of vibrating means, e.g. one sold under the trade name "Syntron." The maintenance of the level 17 is not narrowly critical as it is important only that the wire must pass in an immersed fashion through the material 15. Some of the material 15 will adhere to the wire and be carried upwardly in a substantially vertical pass 18 through an oven generally indicated at 19, which is maintained at a desired temperature by suitable heating means such as one or more electric resistance heating coils 20. As shown in the accompanying drawing, the wire thence passes around an idler 21 and then in a substantially vertical downward pass 22 which may be arranged outside the oven 19; thence around another idler 23 partially immersed in the material 15 in the container 16; thence in a second substantially vertical upward pass 24 through the oven 19; thence around an idler 25 and down in a substantially vertical pass 26 outside the oven 19; thence around an idler 27 which is partially immersed in the material 15 and thence in another substantially vertical upward pass 28 through the oven 19. While the substantially vertical down passes 22 and 26 are described and have been operated outside the oven 19, it will be understood that these passes could go through the oven if the additional heating and/or drying of the wire were desired. As shown, the wire passes thence around an idler 29 and thence through a bath 30 of an organic varnish contained in a container 31, the wire passing through this container around an idler 32. The wire thence passes in a substantially vertical pass 33 through a second oven 34, which is heated by suitable means, for example, by one or more heating coils 35, so as to dry the organic varnish. This heating step generally serves to dry out the one or more volatile solvents used to keep the varnish material of the bath 30 in a fluid condition.

The wire may then pass around an idler 36 and be directed as indicated by the arrow 12 to a suitable take-up reel (not shown). In this condition the wire is completed as a body of insulated wire and may be handled or transported to a desired point of use.

The composition of the material 15 has been set out in detail hereinabove and will be further illustrated in examples which follow. It is noted that in the embodiment of the invention in the accompanying drawing, the wire is given three passes through the material 15 with intermediate drying steps. It will be understood that as many such passes may be used as desired, including one or more, and that in each pass an additional thickness of the inorganic material will be built up on the wire. Another factor which has a direct bearing upon the thickness of the coating on the wire is the speed of movement of the wire, it being found that higher speeds of movement will drag more materials from the body 15 up into the drying oven 19, so as to build up a thicker coating for each pass. Conversely, at lower speeds of wire travel the material of the coating seems to have an opportunity to fall or drain off the wire, so that the thickness for each single pass is less. Again, actual examples of speeds and thicknesses will be given hereinafter.

The particular type of organic varnish used for the bath 30 for coating the partially dried wire is largely immaterial, as it is found that any commercial organic varnish is operative and is satisfactory. This is so as it is believed that the materials constituting the varnish are substantially all dissipated by volatilization and/or burning during the firing of the wire following its winding into a coil or other formation into a desired final shape or form. The preferred varnish in accordance with the present invention is, however, a commercial type of silicone varnish and excellent results have been obtained using this type varnish.

The invention is further illustrated by two particular examples of the present process which follow.

*Example I*

This example is illustrative of the presently preferred embodiment of the invention. In accordance therewith the material 15 shown in the accompanying drawing, which is used as the inorganic coating for the wire, is made up of 210 parts by weight of zirconium oxide in powder form and 140 parts by weight of aluminum phosphate ($AlPO_4$)-water mixture. This mixture is about half water. Thus, there will be about 70 parts by weight of aluminum phosphate ($AlPO_4$) or about one part by weight for each three parts by weight of zirconium oxide. In order that the mixture so formed may be given the desired physical characteristics as a semifluid body and particularly as a thixotropic mixture, there is preferably added to the composition aforesaid about thirty parts by weight of a fine clay such as Monmouth clay. It is believed that this clay does not substantially affect the insulting characteristics of the composition, otherwise made up as aforesaid, but that its primary and substantially sole purpose is to give the desired physical characteristics to the semifluid mixture of the materials through which the wire is passed. The mixture so formed was ball-milled together for about four days; although it is known that this time is not critical and the ball-milling operation is believed to affect only the fineness of the solid particles which should be 400 mesh and finer, at least for coating fine wire as set forth in this example.

With the composition for the material 15 as stated, and with a coating apparatus substantially as shown in the accompanying drawing, wire having an initial diameter of about 0.001 inch had a diameter after coating of about 0.0014 inch; while a wire having an initial diameter of about 0.002 inch had a final diameter after coating of about 0.0025 inch. This wire (in each instance) was passed through apparatus as shown in the drawing at a speed of about 12–15 feet per minute. In this device the bottom of the oven 19 was about 16 inches above the surface 17 of the material 15 and the oven 19 was about one foot in vertical height. The temperature within the oven, maintained by the heating elements 20 therein was about 150° C., which was maintained by a conventional thermostatic control apparatus (not shown). Following the coating of the wire with three successive dips and subsequent dryings as shown in the drawing, the wire was passed through a body 30 of a silicone varnish known and available commercially as "Dow-Corning 804." The wire thence passed from the surface of the varnish upwardly about one foot to the bottom of the heating oven 34, which was about 40 inches in height. The inside of this oven was maintained at a temperature of about 400° C. by the heating elements therein corresponding to that shown at 35.

The wire thus prepared was used in a wire-wound resistor of the general type illustrated in the copending application of the present applicant, Serial No. 799,641, filed March 16, 1959, and now Patent No. 3,012,216, with the exception that the outside of the resistor was protected by an enclosing jacket formed of a material capable of withstanding the high temperatures contemplated for use in accordance with the present invention, i.e. temperatures in the order of magnitude of 500° C. Following the winding of the resistor, which was done in a conventional way, the wound resistor was heated to about 870° C. and held at this temperature for about 20 minutes for the elimination of volatile materials from the coating of the wire. Thereafter the wound resistor was suitably encased in a tight jacket (not shown) usable under the temperature conditions in question and which per se forms no part of the present invention. This resistor when completed was found to have electrical characteristics, even when operating for long periods under high temperature conditions, closely approaching those which are predictable at this operating temperature for the type and size wire used and assuming that perfect wire insulation prevails.

There is shown in FIG. 3 a diagrammatic illustration of a coil prepared around a ceramic core 44 of any suitable configuration and composition illustrating the use of the present invention. Following the winding of the wire which is in the form shown in FIG. 2 at the time it is initially wound, the ceramic core is subjected to high temperatures so as to drive off all volatile materials. This leaves the ceramic coating as the sole insulating material remaining to separate the wires from each other and from the core as particularly shown in FIG. 3 in which the metallic elements of the wires of the several coils are indicated at 10 as heretofore and the ceramic coatings from which all volatile material has been eliminated are indicated at 45.

*Example II*

In this example, which has been found fully operative, although not as desirable from all points of view as that set out in Example I, the composition of the material 15 is made up using 150 parts by weight zirconium oxide and 150 parts by weight of aluminum metaphosphate, both in fine particle form (400-mesh and finer). To these materials was added a liquid mixture totalling 225 parts by weight. One-half of this mixture was aluminum phosphate ($AlPO_4$) in water (about 50–50), so that for 150 parts by weight of zirconium oxide there was approximately 56 parts by weight of aluminum phosphate or roughly three to one, as hereinabove set forth. The other half of this liquid mixture was 1% gelatin-water solution, the gelatin being used as a temporary binder in this case.

This mixture was used under substantially the same conditions set out in Example I and resulted in an insulated wire, which had almost as good electrical characteristics, but was somewhat inferior to that of Example I in that the insulation formed was somewhat more brittle than that formed in accordance with Example I and was somewhat easier chipped in use. It was, however, fully operative and was generally satisfactory from an electrical point of view.

While there has been herein shown and described but a few embodiments of the present invention, an attempt has been made to set out equivalents as to each of the several steps and/or materials used as the description proceeded. Other equivalents will occur to those skilled in the art from the foregoing particular disclosure. I do not wish to be limited, therefore, except by the scope of the appended claims, which are to be construed validly as broadly as the state of the art permits.

What is claimed is:

1. An insulated wire for use at temperatures above that at which insulating materials of an organic nature are usable, comprising a wire of conductive material coated with a layer consisting essentially of (a) at least one solid refractory oxide selected from the group consisting of the oxides of zirconium, titanium, silicon and aluminum and (b) aluminum phosphate ($AlPO_4$), said coating further having a substantial moisture content; and an outer coating enveloping the first-named coating and consisting essentially of an organic varnish, said varnish serving to minimize dissipation of the moisture content of the first-named coating, and the wire so prepared being sufficiently flexible that it may be formed into predetermined coiled forms without substantial damage to the coating.

2. An insulated wire for use at temperatures above that at which insulating materials of an organic nature are usable, comprising a wire of conductive material coated with a layer consisting essentially of (a) about three parts by weight of a least one solid refractory oxide selected from the group consisting of the oxides of zirconium, titanium, silicon, and aluminum, and (b) about one part by weight of aluminum phosphate ($AlPO_4$), said coating further having a substantial moisture content; and an outer coating enveloping the first-named coating and consisting essentially of an organic varnish, said varnish serving to minimize dissipation of the moisture content of the first-named coating, and the wire so prepared being sufficiently flexible that it may be formed into predetermined coiled forms without substantial damage to the coating.

3. An insulated wire for use at temperatures above that at which insulating materials of an organic nature are usable, comprising a wire of conductive material coated with a layer consisting essentially of (a) about three parts by weight of zirconium oxide, (b) about one part by weight of aluminum phosphate ($AlPO_4$), and about one-half part by weight of fine clay, said coating further having a substantial moisture content; and an outer coating enveloping the first-named coating and consisting essentially of an organic varnish, said varnish serving to minimize dissipation of the moisture content of the first-named coating, and the wire so prepared being sufficiently flexible that it may be formed into predetermined coiled forms without substantial damage to the coatings.

4. An insulated wire for use at temperatures above that at which insulating materials of an organic nature are usable, comprising a wire of conductive material coated with a layer consisting essentially of (a) two parts by weight of at least one solid refractory oxide selected from the group consisting of the oxides of zirconium, titanium, silicon and aluminum, (b) about two parts by weight of aluminum metaphosphate, (c) about two-thirds of a part by weight of aluminum phosphate ($AlPO_4$), and (d) a minor proportion of gelatin, said coating further having a substantial moisture content; and an outer coating enveloping the first-named coating and consisting essentially of an organic varnish, said varnish serving to minimize dissipation of the moisture content of the first-named coating, and the wire so prepared being sufficiently flexible that it may be formed into predetermined coiled forms without substantial damage to the coating.

5. A wire coil adapted for electrical uses at elevated temperatures made up of a plurality of turns of wire separated from each other solely by a ceramic insulation consisting essentially of (a) about three parts by weight of at least one solid refractory oxide selected from the group consisting of the oxides of zirconium, titanium, silicon and aluminum, and (b) about one part by weight of aluminum phosphate ($AlPO_4$), and wherein said insulation is substantially free of all materials which are volatile at temperatures up to about 870° C.

6. A wire coil according to claim 5, in which said refractory oxide is zirconium oxide.

References Cited in the file of this patent

UNITED STATES PATENTS

| | | |
|---|---|---|
| 2,084,825 | Ruben | June 22, 1937 |
| 2,213,969 | Ruben | Sept. 10, 1940 |
| 2,421,652 | Robinson et al. | June 3, 1947 |
| 2,688,182 | Dorst | Sept. 7, 1954 |
| 2,827,393 | Kadisch et al. | Mar. 18, 1958 |
| 2,848,794 | Roth | Aug. 26, 1958 |
| 2,906,009 | Knoll et al. | Sept. 29, 1959 |
| 2,975,078 | Rayfield | Mar. 14, 1961 |